United States Patent
Shin et al.

(10) Patent No.: US 7,065,085 B2
(45) Date of Patent: Jun. 20, 2006

(54) METHOD FOR SUMMARIZING DEFAULT ADDRESS OF PNNI LOWEST LEVEL NODE IN ATM SWITCHING SYSTEM

(75) Inventors: Hyun Soon Shin, Daejeon (KR); Sung Back Hong, Daejeon (KR)

(73) Assignees: Electronics and Telecommunications Research Institute (KR); Korea Telecom (KR)

( * ) Notice: Subject to any disclaimer, the term of this patent is extended or adjusted under 35 U.S.C. 154(b) by 1002 days.

(21) Appl. No.: 10/096,711

(22) Filed: Mar. 12, 2002

(65) Prior Publication Data
US 2003/0076833 A1    Apr. 24, 2003

(30) Foreign Application Priority Data
Oct. 24, 2001  (KR) ................ 2001-65702

(51) Int. Cl.
*H04L 12/56*    (2006.01)
(52) U.S. Cl. ............. 370/392; 370/395.1; 370/401
(58) Field of Classification Search ........... 370/392, 370/401, 395.1
See application file for complete search history.

(56) References Cited

U.S. PATENT DOCUMENTS

| | | | | |
|---|---|---|---|---|
| 5,999,517 A | * | 12/1999 | Koning et al. | 370/255 |
| 6,246,689 B1 | | 6/2001 | Shavitt | 370/406 |
| 6,456,600 B1 | * | 9/2002 | Rochberger et al. | 370/255 |
| 6,532,237 B1 | * | 3/2003 | Or et al. | 370/396 |

FOREIGN PATENT DOCUMENTS

| | | |
|---|---|---|
| EP | 0 980 191 A1 | 2/2000 |
| EP | 0 984 655 A1 | 3/2000 |
| KR | 1020000013859 | 3/2000 |
| KR | 1020010038485 | 5/2001 |
| KR | 1020010063094 | 7/2001 |

* cited by examiner

*Primary Examiner*—Chi Pham
*Assistant Examiner*—Tito Pham
(74) *Attorney, Agent, or Firm*—Blakely Sokoloff Taylor & Zafman (57) ABSTRACT

Disclosed herein is a method for summarizing a default address of a PNNI (Private Network-Network Interface) lowest level node in an ATM (Asynchronous Transfer Mode) switching system. In the method, first, a database for storing prefix information, node information and reachable address information is constructed. Parameters inputted for creating an internal prefix is arranged to be adaptable to the system, a prefix information is generated by checking the validation and address system of the parameters inputted for creating the internal prefix, and the prefix information is registered in the prefix information database. An ATM end system address is generated by checking the validation and address system of parameters inputted for creating the node information. The node address of the node information is summarized up to the bit length of the internal prefix and the summarization of a default reachable address is performed by defining the internal prefix as the default reachable summarization address.

12 Claims, 10 Drawing Sheets

FIG. 1

| | 41 | 42 | 43 | 44 | 45 | 46 | 47 |
|---|---|---|---|---|---|---|---|
| Pfx Info.(0) | Numbering Plan Identifier | Type Of Number | Call Type | Proto Type | Prefix Digit | Prefix Length | } 48 |
| Pfx Info.(1) | NPI | Type Of Number | Call Type | Proto Type | Prefix Digit | Prefix Length | |
| Pfx Info.(2) | NPI | Type Of Number | Call Type | Proto Type | Prefix Digit | Prefix Length | |
| Pfx Info.(3) | NPI | Type Of Number | Call Type | Proto Type | Prefix Digit | Prefix Length | |
| ⋮ | ⋮ | ⋮ | ⋮ | ⋮ | ⋮ | ⋮ | |
| Pfx Info.(7) | NPI | Type Of Number | Call Type | Proto Type | Prefix Digit | Prefix Length | |
| Pfx Info.(8) | NPI | Type Of Number | Call Type | Proto Type | Prefix Digit | Prefix Length | |
| Pfx Info (9) | NPI | Type Of Number | Call Type | Proto Type | Prefix Digit | Prefix Length | |

| | 51 | 52 | 53 | 54 | 55 | 56 | 57 | |
|---|---|---|---|---|---|---|---|---|
| | Node No.(0) | Node ID | Peer Group ID | AESA | Level ID | Leader PRI | Nodal Flag | 58 |
| | Node No.(1) | Node ID | Peer Group ID | AESA | Level ID | Leader PRI | Nodal Flag | |
| | Node No.(2) | Node ID | Peer Group ID | AESA | Level ID | Leader PRI | Nodal Flag | |
| | Node No.(3) | Node ID | Peer Group ID | AESA | Level ID | Leader PRI | Nodal Flag | |
| | ⋮ | ⋮ | ⋮ | ⋮ | ⋮ | ⋮ | ⋮ | |
| | Node No.(7) | Node ID | Peer Group ID | AESA | Level ID | Leader PRI | Nodal Flag | |
| | Node No.(8) | Node ID | Peer Group ID | AESA | Level ID | Leader PRI | Nodal Flag | |
| | Node No.(9) | Node ID | Peer Group ID | AESA | Level ID | Leader PRI | Nodal Flag | |

| Reachable Address Prefix. | Reachable Address Prefix Length | Port Identifier | Scope Advertisement | Level ID |
|---|---|---|---|---|
| Reachable Address Prefix. | Reachable Address Prefix Length | Port Identifier | Scope Advertisement | Level ID |
| Reachable Address Prefix. | Reachable Address Prefix Length | Port Identifier | Scope Advertisement | Level ID |
| Reachable Address Prefix. | Reachable Address Prefix Length | Port Identifier | Scope Advertisement | Level ID |
| ⋮ | ⋮ | ⋮ | ⋮ | ⋮ |
| Reachable Address Prefix. | Reachable Address Prefix Length | Port Identifier | Scope Advertisement | Level ID |
| Reachable Address Prefix. | Reachable Address Prefix Length | Port Identifier | Scope Advertisement | Level ID |
| Reachable Address Prefix. | Reachable Address Prefix Length | Port Identifier | Scope Advertisement | Level ID |

METHOD FOR SUMMARIZING DEFAULT ADDRESS OF PNNI LOWEST LEVEL NODE IN ATM SWITCHING SYSTEM

BACKGROUND OF THE INVENTION

1. Field of the Invention

The present invention relates generally to a method for summarizing a default address of a private network-network interface lowest level node in an asynchronous transfer mode switching system, and more particularly to a method for summarizing a default address of a private network-network interface lowest level node, which is capable of summarizing the default address at the time of interfacing with a public network.

2. Description of the Prior Art

Recently, interest in Private Network-Network Interface (PNNI) effective in offering a variety of multimedia communication services and data services in an Asynchronous Transfer Mode (ATM) network is gradually being increasing.

The PNNI is a protocol for establishing an ATM Switched Virtual Connection (SVC) between ATM switching system, which was originally conceived for a private network using an ATM address in the form of a Network Service Access Point (NSAP) in the ATM forum.

PNNI routing is characterized in that the network configuration of a hierarchical structure is enabled and dynamic routing is supported. Here, the hierarchical structure is referred to as a network structure in which more than one node are tied into a plurality of peer groups which are further tied into a plurality of upper level peer groups. The dynamic routing is referred to as the establishment of a connection by source routing based on topology information distributed between switching system. The hierarchical structure allows the large network scalability, and the dynamic routing allows the efficient use of a network resource.

Nevertheless, as an ATM switching system tends to be connected to various kinds of networks when it is actually constructed, there exists a need for the PNNI to be smoothly applied to not only private networks but also public networks.

However, when the PNNI is applied to the public networks, there occurs a problem that the default address summarized according to the specification of the PNNI cannot be used as it is in the public networks, which will be further discussed below.

In the switching system using the PNNI, as part of the dynamic routing, reachable addresses for nodes should be dynamically exchanged between the switchers during operation of the system. On the other hand, since the PNNI has a hierarchical structure, there is a need to reduce overhead in exchange of information through a large network. To this end, PNNI specification 1.0 defines prefix information of 13 octets length, i.e., 104 bytes, with respect to default address summarization regarding a node address. As mentioned earlier, the PNNI was originally conceived for the private networks. When such PNNI is applied to the public networks and the prefix information of 13 octets length with respect to default address summarization is used, there occurs a problem that the point of default address summarization cannot be applied to the public networks. This is because the prefix information of 13 octets length can merely distinguish subscriber numbers in the public networks due toe poor application of the default address summarization function in the public networks, though it can distinguish one private network from another private network. Then, when the PNNI is applied to the public networks, since the default address summarization function is not properly operated and so the information on the reachable address becomes enormous, there is a problem that the public networks suffers from overload.

As a prior art for the PNNI, Korean patent laid-open No. 2001-38485 entitled "A method for reducing nodes in PNNI" is disclosed.

The object of the above prior art is to use more efficiently the network to which the PNNI is applied and reduce the probability of failure at the time of selecting a connection path by reducing node information by use of complex node representation properly reflecting the characteristics of nodes and links within the peer groups.

In order to accomplish the above object, the prior art is characterized in that it comprises the steps of searching edge nodes within peer groups and defining the edge nodes reflected in internal links as ports of complex nodes, identifying parameters defining the state of each of the ports, and constructing radius, exception, and bypass for the identified parameters.

However, the described prior art describes only summarization of the information on nodes and links within peer groups of the network to which the PNNI is applied, but is not contemplated for an application to the public networks. In addition, even when the PNNI is applied to the public networks, the default address summarization of the lowest level node is not described at all, and even any relevance to the default address summarization is not mentioned therein.

SUMMARY OF THE INVENTION

Accordingly, the present invention has been made keeping in mind the above problems occurring in the prior art, and an object of the present invention is to provide a method for summarizing a default address of a PNNI lowest level node by which a reachable address for the node can be summarized up to an internal prefix length when PNNI is applied to public networks in an ATM switching system.

In accordance with an aspect of the present invention, a method for summarizing a default address of private network-network interface lowest level node, which is applicable to an asynchronous transfer mode (ATM) switching system employing private network-network interface (PNNI) for public networks, comprising: a first step of constructing a database for storing prefix information, node information, and reachable address information; a second step of arranging parameters inputted for creating an internal prefix to be adaptable to the system, generating the prefix information by checking the validation and address system of the parameters inputted for creating the internal prefix, and registering the prefix information in the prefix information database; a third step of generating an ATM end system address by checking the validation and address system of parameters inputted for creating the node information, and if it is determined that the ATM end system address includes internal prefix and a node address is not yet assigned from the digit state of the ATM end system address, generating the node information using the parameters for creating the node information and the ATM end system address, and registering the node information in the node information database; and a fourth step of summarizing the node address of the node information up to the bit length of an internal prefix and performing summarization of a default reachable address by defining the internal prefix as the default reachable summarization address.

According to the present invention, by providing a method summarizing the default address of the lowest level node by which the reachable address for the node can be summarized up to an internal prefix length, a default address summarization function can be effectively used in an ATM switching system employing the PNNI for the public networks. Therefore, since the reachable address for the node is dynamically exchanged during a system operation, overhead in information exchange can be reduced and data related to the networks is effectively managed by automatically constructing topology information on the networks.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described with reference to the accompanying drawings.

Figure 1:
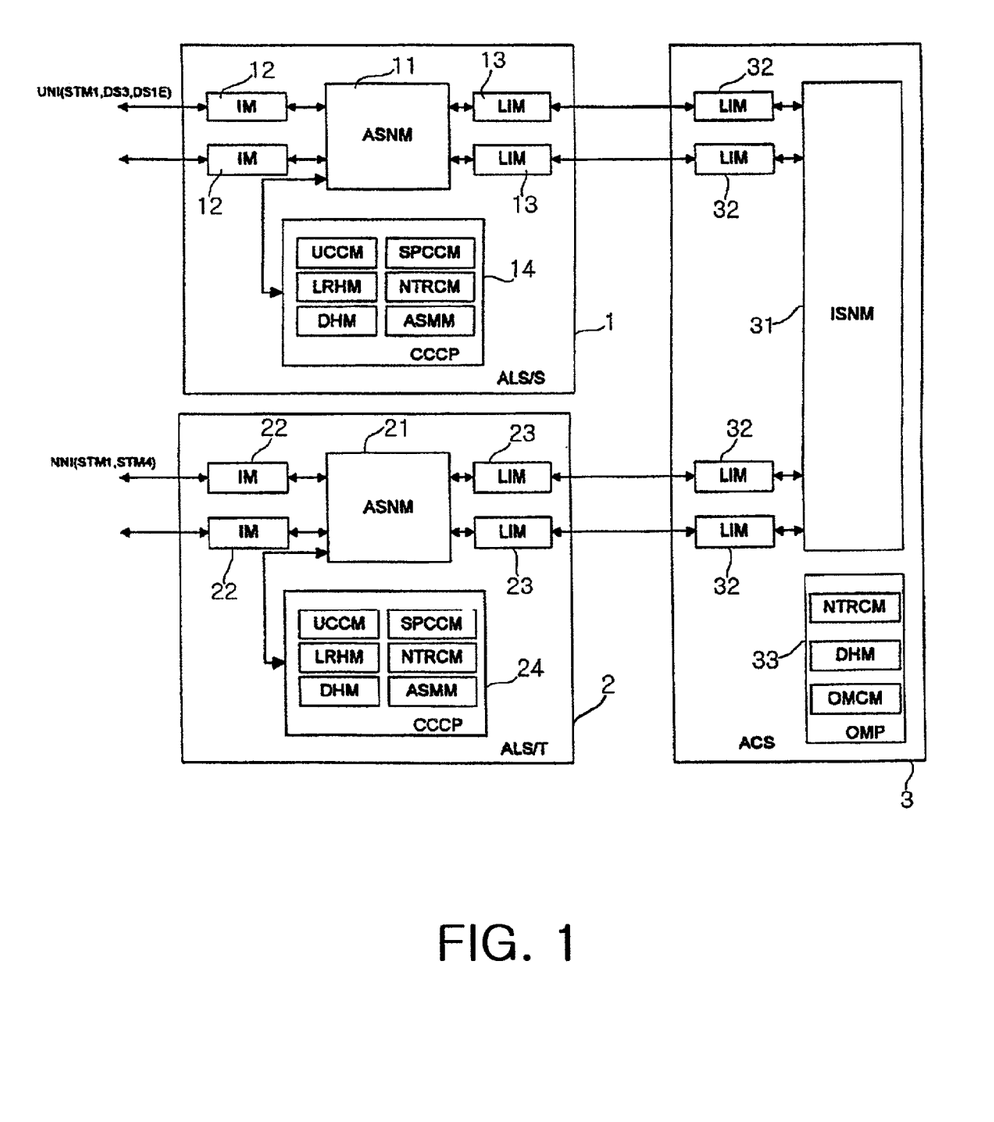
FIG. 1 is a subsystem configuration of an ATM switching system to which the present invention is applied.

FIG. 1 shows a subsystem configuration of an ATM switching system to which the present invention is applied.

Referring to FIG. 1, an entire subsystem is distributed by two ATM Local Switching Subsystems (ALSs) 1 and 2 interconnected by an ATM Central Switching Subsystem (ACS) 3.

A transfer network consists of Access Switch Network Modules (ASNMs) 11 and 21 within the ALSs 1 and 2, an Interconnection Switch Network Module (ISNM) 31 within the ACS 3, Link Interface Modules (LIM) 13 and 32 each connected between the ASNMs 11 and 21 and the ISNM 31, and Interface Modules (IMs) 12 and 22 for a subscriber/relay line.

A control network consists of Call and Connection Control Processors (CCCPs) 14 and 24 for processing a call/connection control function and an operating and Maintenance Processor (OMP) 33 for processing an operating/maintenance control function. Here, each of CCCPs 14 and 24 includes a variety of software modules for performing various call/connection control, signal protocol processing, subscriber network resource management, network node interface link resource management, internal switch link resource management, station number translation, and link and subscriber service profile data processing, etc. In addition, the OMP 33 includes a variety of software modules for performing an operating and maintenance function of the system, incoming number translation, route control, and route and number data processing, etc. Communication between these processors 14, 24 and 33 is accomplished through a corresponding one of the switch network modules 11, 21 and 31.

The method for summarizing a default address of a PNNI lowest level node according to the present invention consists roughly of steps of generating a database for prefix information, node information and reachable address information, constructing an internal prefix for the PNNI lowest level node, and summarizing a default address. Here, the method for summarizing a default address of the PNNI lowest level node according to the present invention can be implemented by a computer program to be stored in such a data recording medium as a CD-ROM.

Figure 2A:
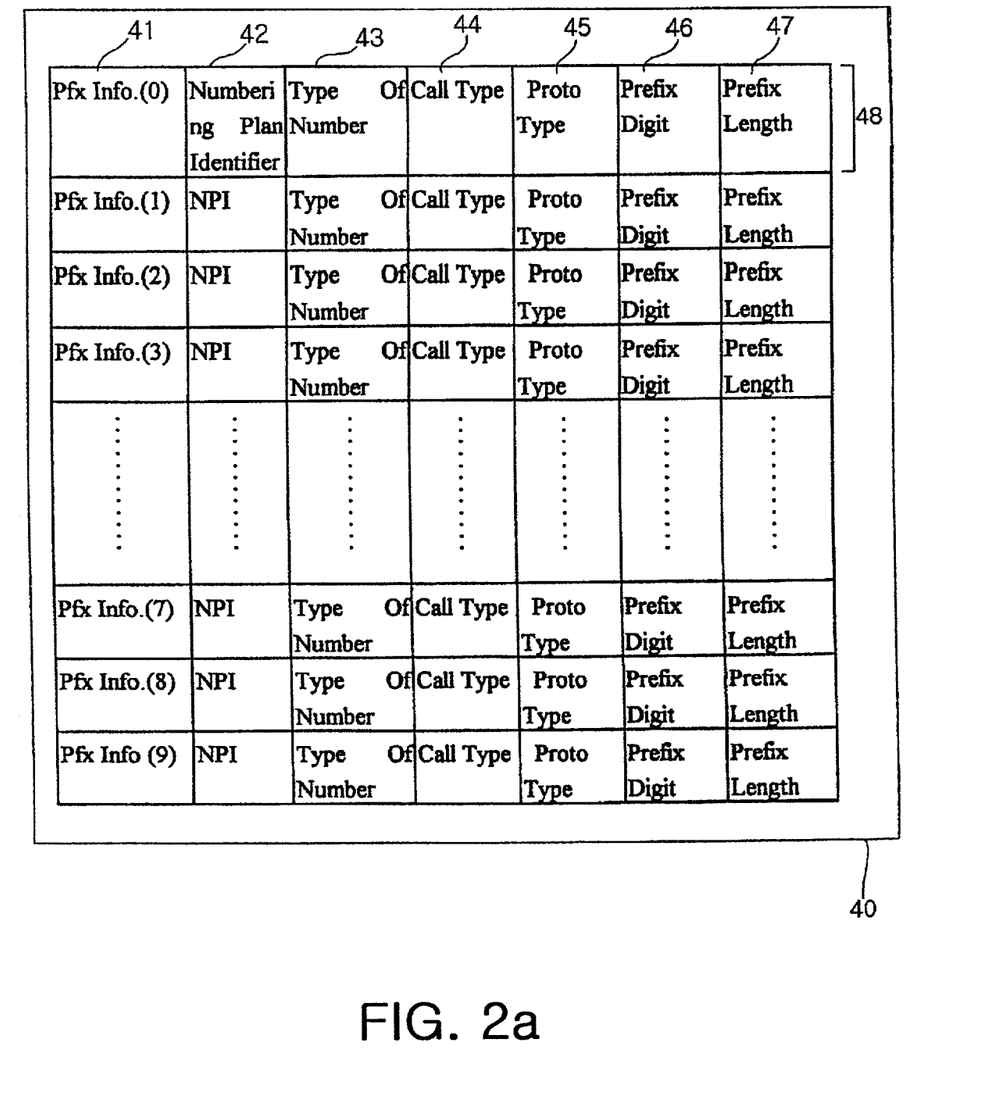
FIGS. 2a to 2c are database configurations for applying to a method for summarizing a default address according to the present invention.
Figure 2B:
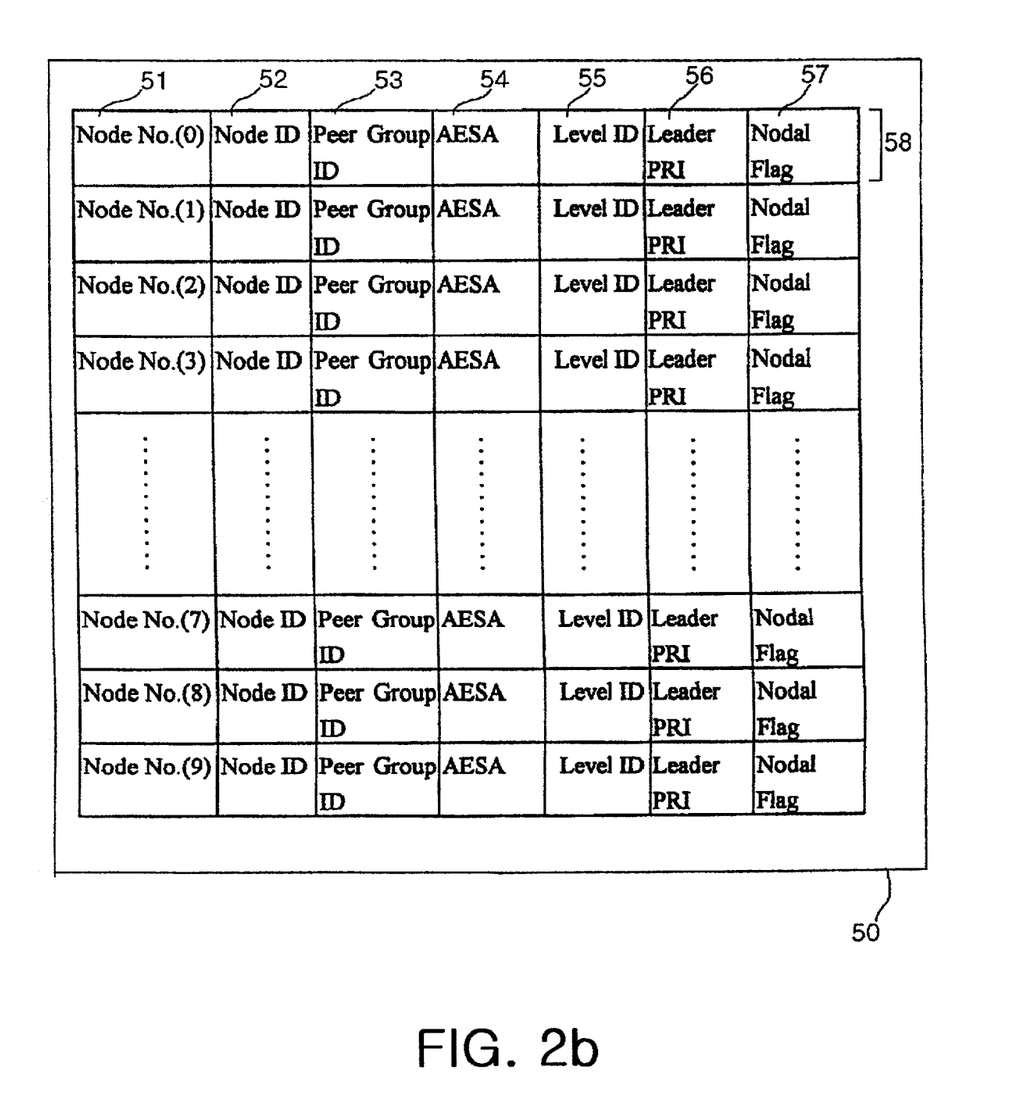
Figure 2C:
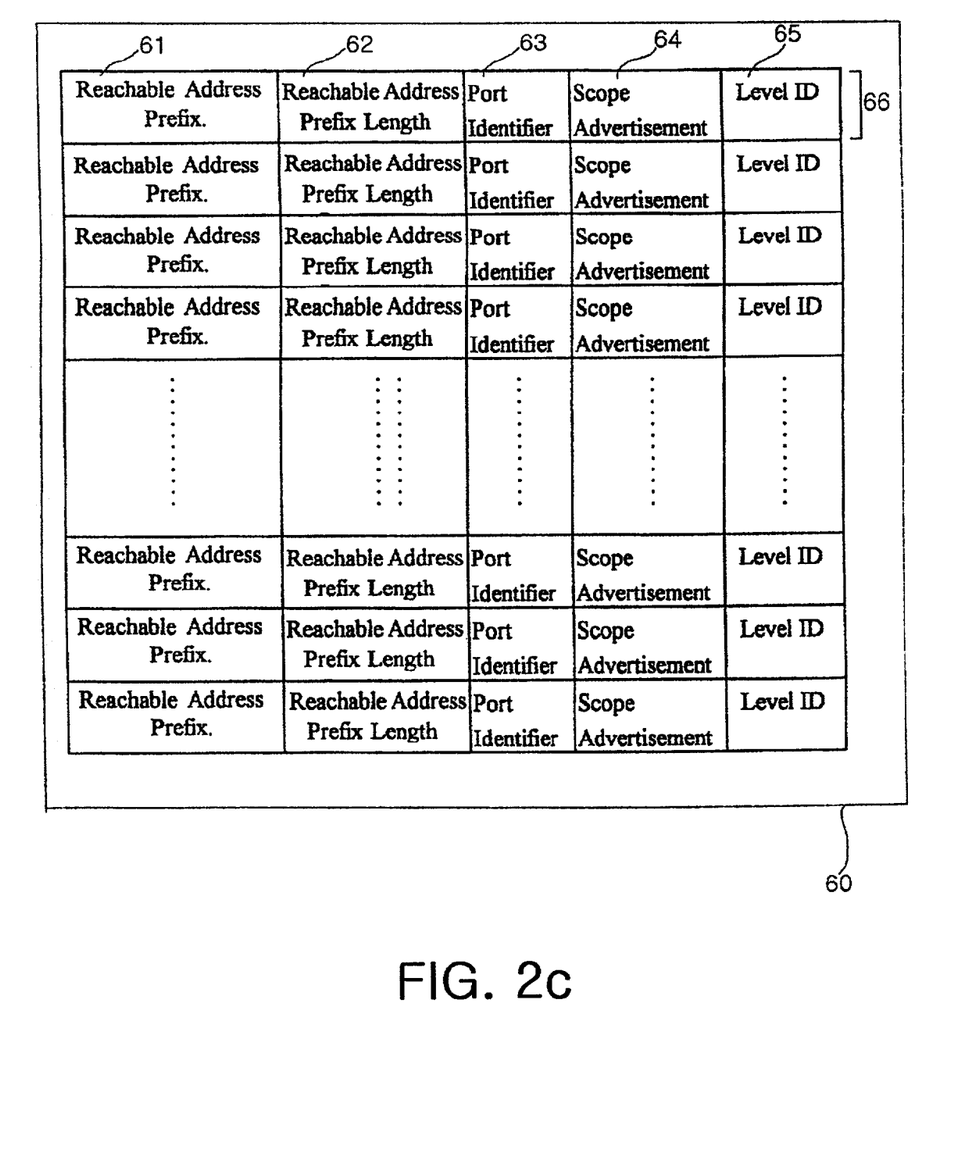

Now, referring to FIGS. 2a to 2c, a process for generating a database for prefix information, node information and reachable address information is described.

FIG. 2a shows a prefix information database 40, FIG. 2b shows a node information database 50, and FIG. 2c shows a reachable address information database 60.

Referring to FIG. 2a, the prefix information database 40 has a plurality of tuples 48, each comprising a prefix information key 41, a numbering plan identifier 42, a type of number 43, a call type 44, a protocol type 45, a prefix digit 46, and a prefix length 47, and is structured in a sequential manner by the number of prefixes acceptable by the system. Here, the prefix digit 46 functions as a key to allow a corresponding one of the tuples 48 to be accessed.

Referring to FIG. 2b, the node information database 50 has a plurality of tuples 58, each comprising a node number 51, a node ID 52, a peer group ID 53, an ATM end system address (AESA) 54, a level ID 55, a leader priority 56, and a nodal flag 57, and is structured in a sequential manner by the number of nodes acceptable by the system. Here, the node number 51 functions as a key to allow a corresponding one of the tuples 58 to be accessed.

Referring to FIG. 2c, the reachable address information database 60 has a plurality of tuples 66, each comprising a reachable address prefix 61, a reachable address prefix length 62, a port identifier 63, a scope advertisement 64, and a level ID 65, and is structured in a sequential manner by the number of reachable addresses acceptable by the node. Here, the reachable address functions as a key to allow a corresponding one of the tuples 66 to be accessed.

Figure 3A:
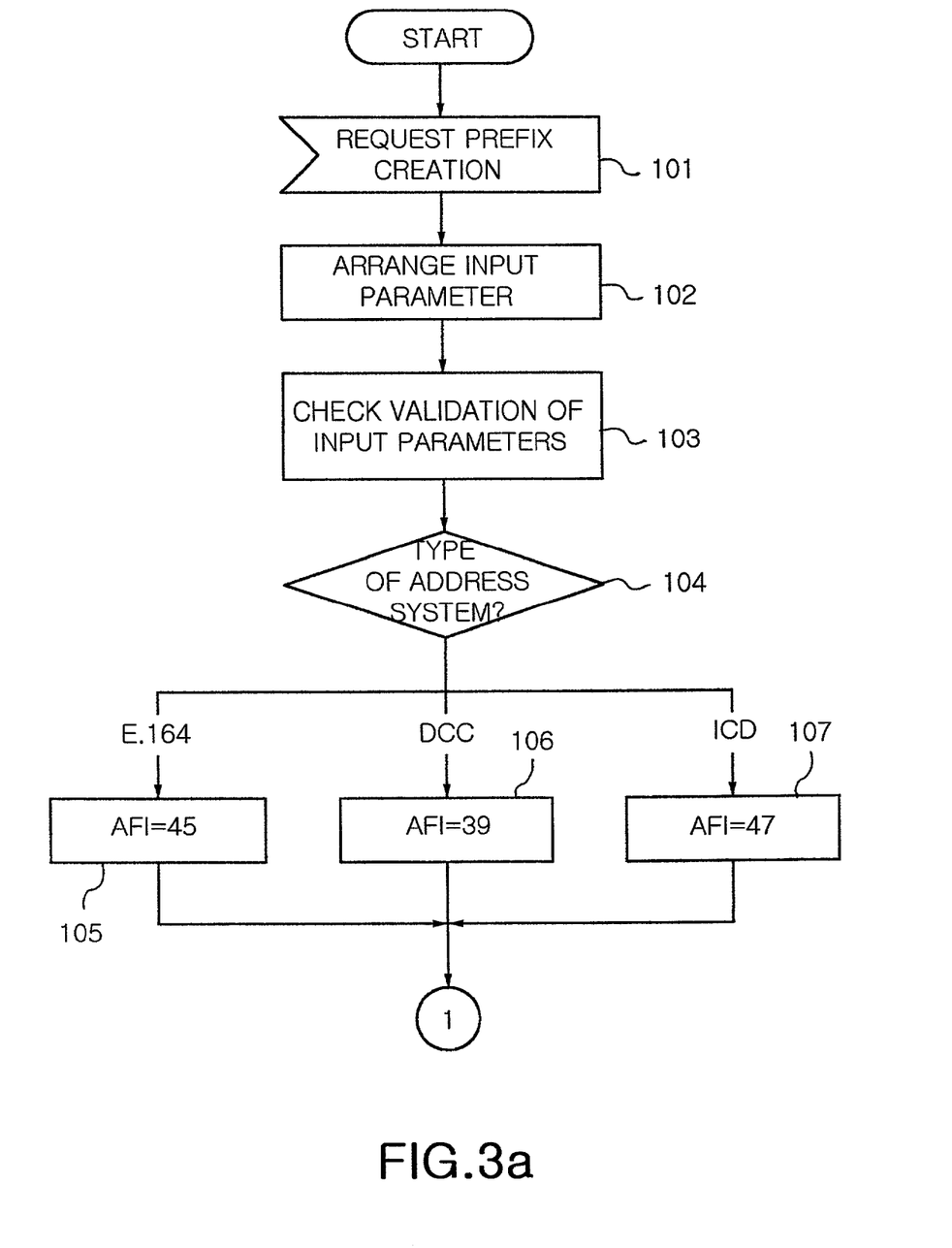
FIGS. 3a and 3b are flowcharts illustrating a procedure for constructing an internal prefix for a PNNI lowest level node in order to perform the method for summarizing a default address according to the present invention.
Figure 3B:
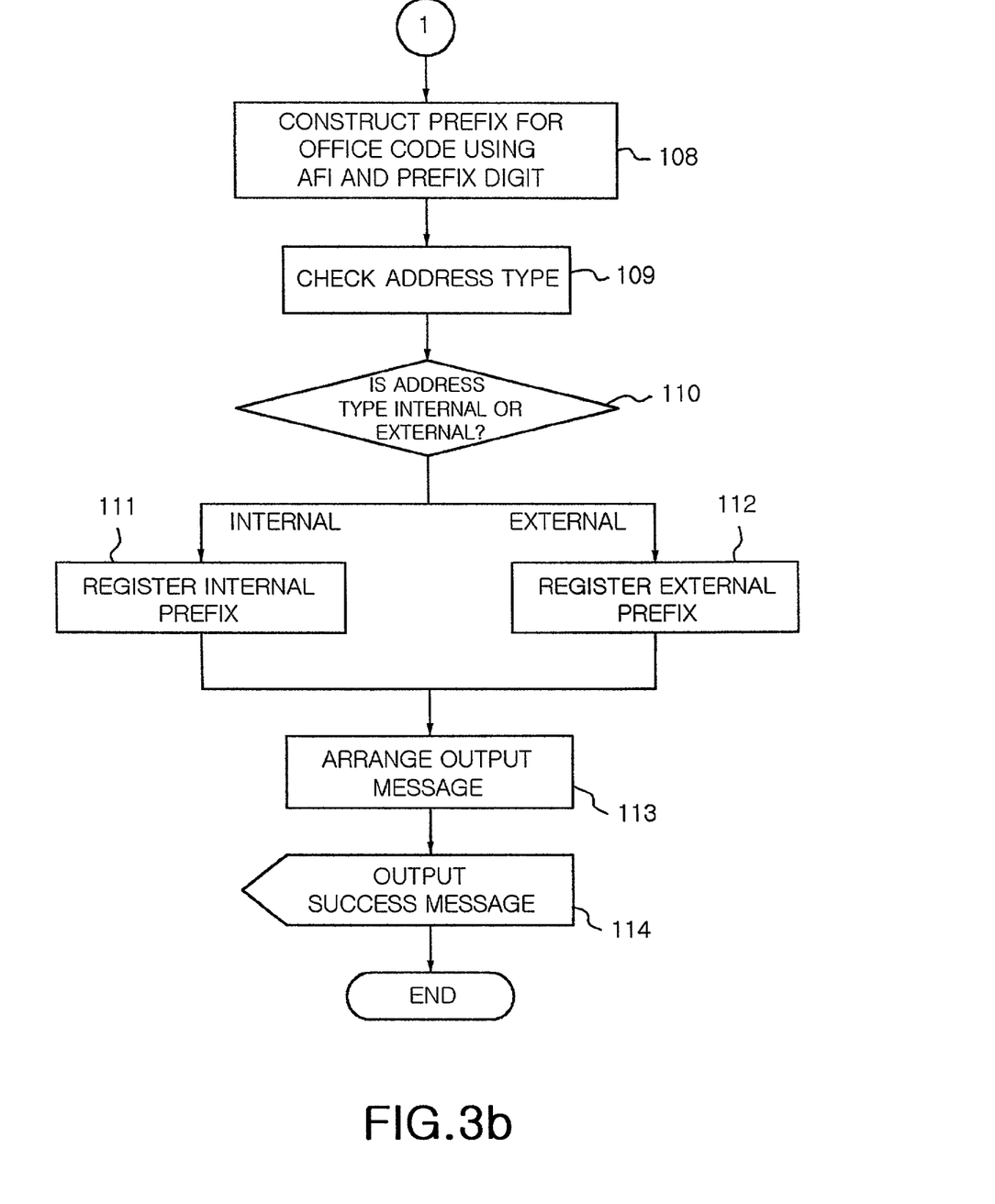

Next, a process for constructing an internal prefix for a PNNI lowest level node is described with reference to FIGS. 3a and 3b.

First, when an operation starts and a prefix creation request is inputted in step 101, input parameters are arranged in a form adaptable to the system in step 102 and these input parameter data are checked for their validation in step 103. Here, the input parameters include a numbering plan identifier, a type of number, an authority format identifier, an address type, a call type and a prefix digit, etc.

According to a result of validation check in step 103, it is determined in step 104 which of E.164, Data Country Code (DDC) and International Code Designator (ICD) a type of address system corresponds to, and an AFI is defined for each case in steps 105 to 107.

Next, a prefix digit for Office code is constructed using the defined AFI and the prefix digit in step 108. After performing the step 108, the address type of the prefix is checked by means of the call type in step 109.

Next, according to the result of check of the address type, it is determined in step 110 whether the address type is an internal prefix or an external prefix. If the address type is the internal prefix in step 110, the prefix digit and inputted information are registered as internal prefix information in the prefix information database 40 shown in FIG. 2a in step 111, and an output message "success" is arranged in step 113 and a processing success message is outputted in step 114, and then the process is terminated.

Next, a process for summarizing a default address of a PNNI lowest level node is described with reference to FIGS. 4a to 4d.

Figure 4A:
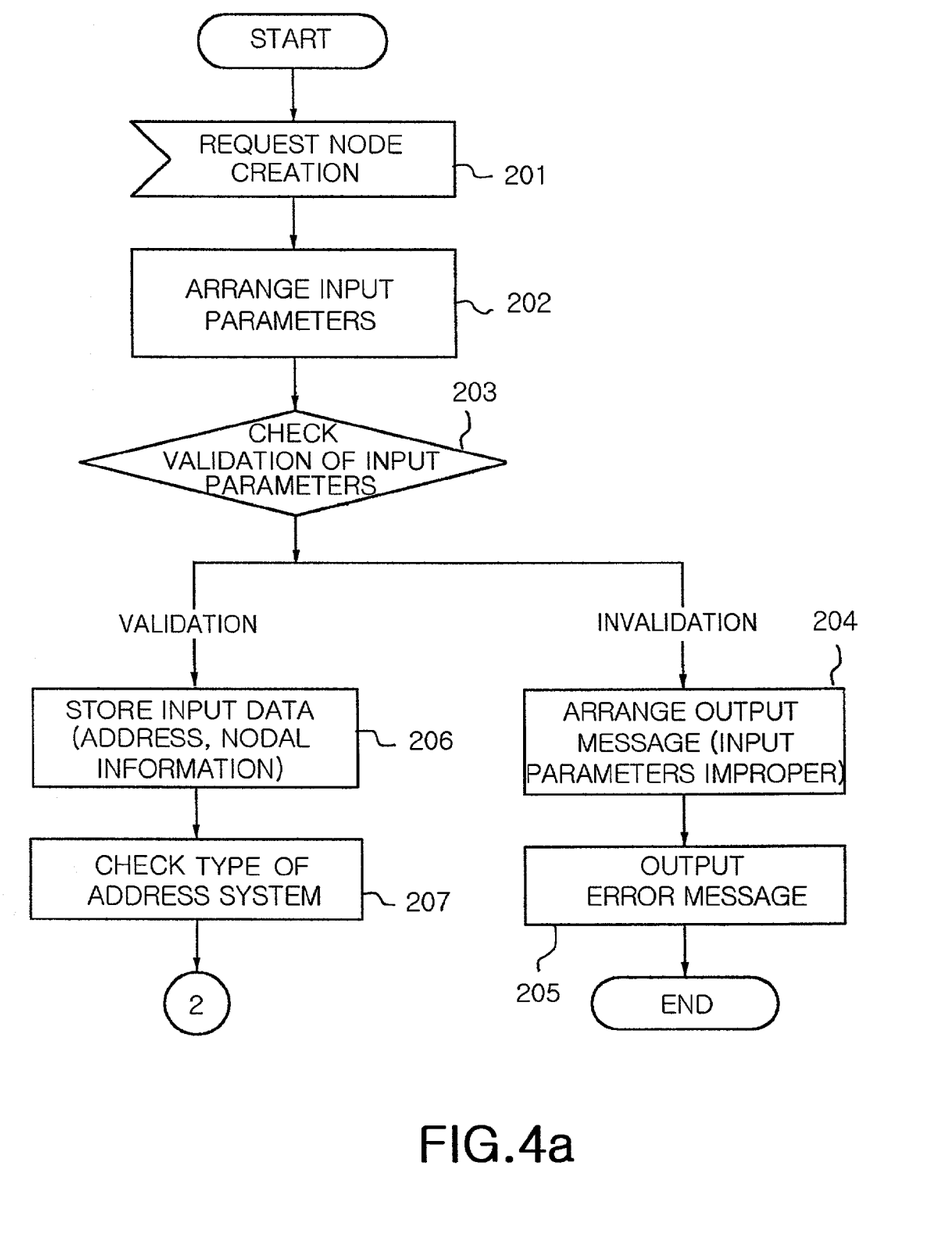
FIGS. 4a to 4d are flowcharts for illustrating the method for summarizing a default address according to the present invention.

First, when an operation starts and a node creation request is inputted in step 201, input parameters are arranged in a form adaptable to the system in step 202. Here, the input parameters include a level ID, an address type, an address, a priority, a nodal flag, etc. These input parameter data are checked for their validation in step 203.

As a result of determination in step 203, if the input parameters are valid, input data such as an address and nodal information are stored in the database in step 206 and the type of an address system is checked in step 207. If it is determined in step 203 that the input parameters are invalid, an output message "input parameter improper" is arranged in step 204, a processing error message is outputted in step 205, and then the process is terminated.

According to the type of an address system checked in step 207, it is determined in step 208 which of E.164, the DDC and the ICD the type of an address system corresponds to, and an Authority and Format Identifier (AFI) is defined for each case in steps 209 to 211.

Figure 4B:
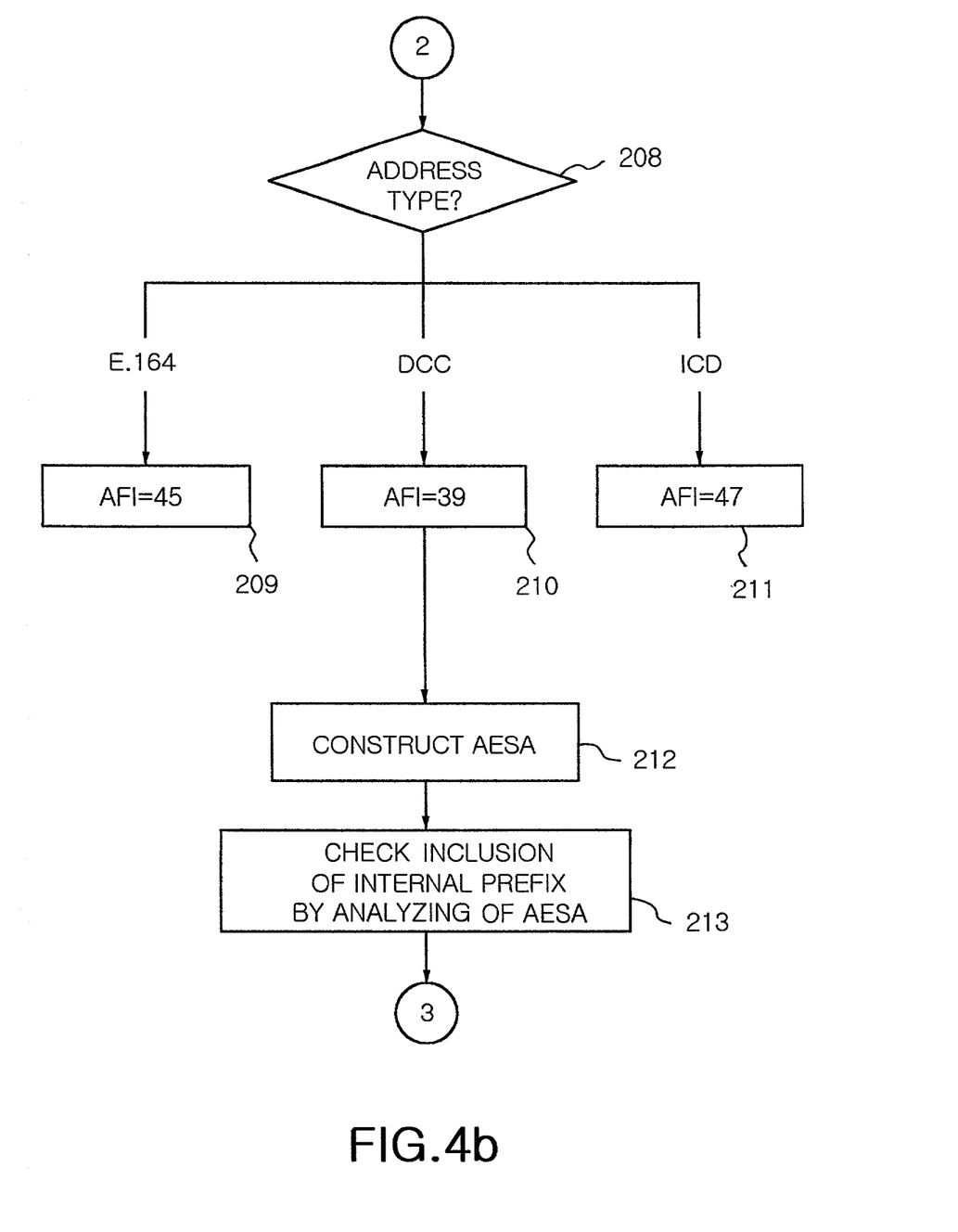

Next, using the AFI defined in the steps 209 to 211, a prefix previously inputted and an End System Identifier (ESI) previously inputted, an AESA of 20 octets length is constructed in step 212. Next, the inclusion of an Internal Prefix in a node address is checked by analyzing all the digits of the constructed AESA in step 213 and it is determined in step 214 whether the node address includes the internal prefix or not. It is determined in step 214 that the node address does not include the internal prefix, an output message "node creation improper" is arranged to limit the generation function of the node ID in step 215, a processing error message is outputted in step 216, and then the process is terminated.

Figure 4C:
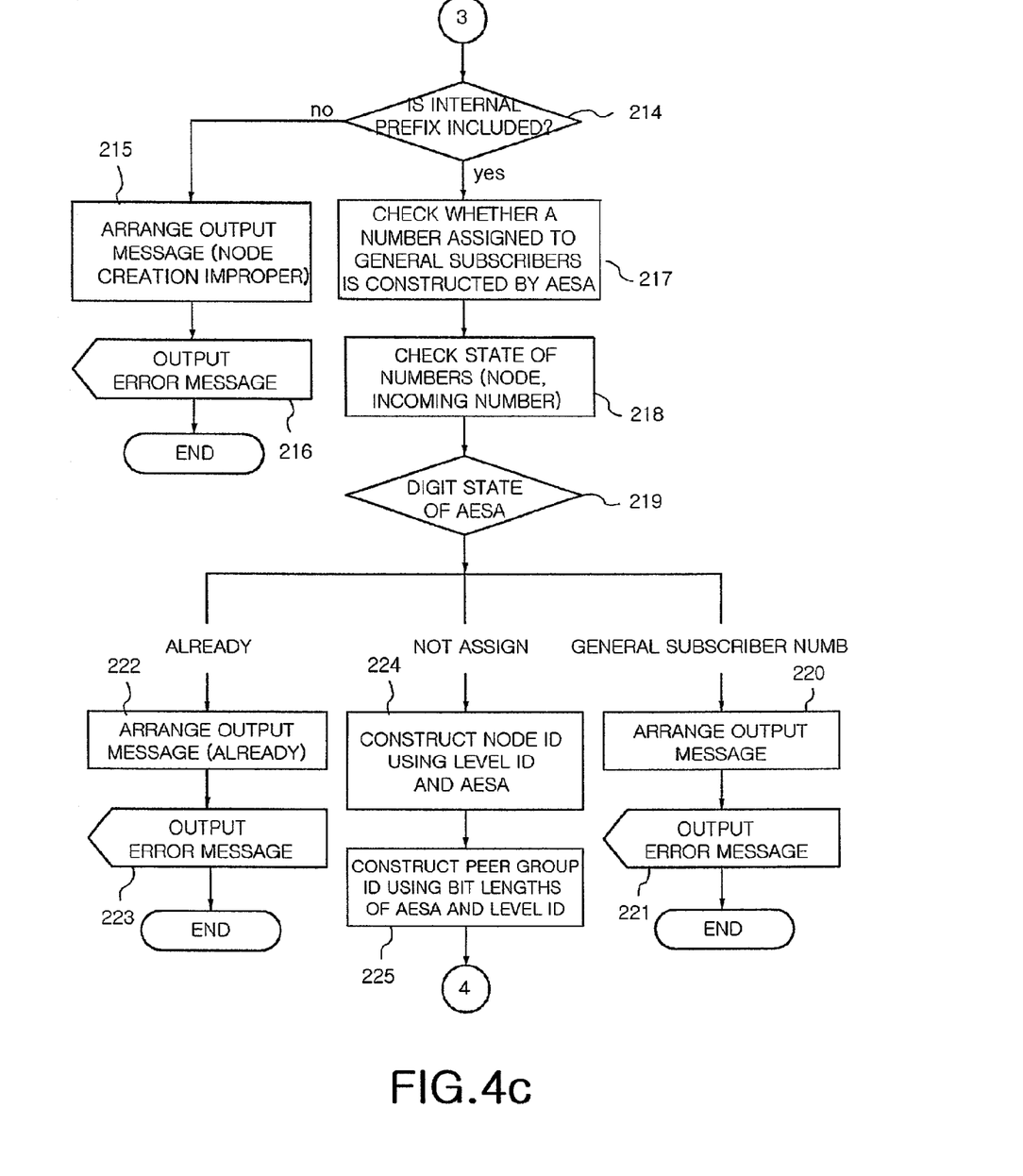

If it is determined in step 214 that the node address includes the internal prefix, then it is determined in step 217 whether a number assigned to a general subscriber is constructed by the AESA so as to determine whether the node address is a previously registered node address or a general subscriber number. Then, the state of numbers such as node and incoming numbers is checked in step 218. Next, according to the results of the determination and the check, it is determined in step 219 whether the Node Address is previously registered from the digit state of the AESA, it is not yet assigned, or it is a general subscriber number. If it is determined in step 219 that the Node Address has been previously registered, an output message "Already" representing 'in use' is arranged in step 222, a processing error message is outputted in step 223, and then the process is terminated. If it is determined in step 219 that the Node Address is assigned as the general subscriber number. An output message "general subscriber number" is arranged in step 220, a processing error message is outputted in step 221, and then the process is terminated.

If it is determined in step 219 that the node address is not yet assigned, in other words, the node address includes an internal prefix but is not assigned, the node ID is constructed using the level ID and the AESA of the input parameters in step 224. Subsequently, a peer group ID is constructed using the bit length of the AESA and the level ID in step 225. Here, the peer group ID consists of a level ID and a prefix of an AESA, particularly a prefix having the bit length of the level ID among the prefix (13 octets) of the AESA.

Next, a nodal flag is constructed using a parameter related to the inputted node in step 226 and then a corresponding tuple in the node information database shown in FIG. 2b is searched and the node information is stored in step 227. Here, the nodal flag is constructed in the form of an 8 bit string with first to third bits reserved and fourth to eighth bits used. For example, if a value of an inputted parameter is "True", a corresponding bit is set to 1, and if "False", the bit is set to 0, thus constructing the 8 bit nodal flag. When the constructed nodal flag is stored in the node information database in step 227, the level ID is used as a key.

Figure 4D:
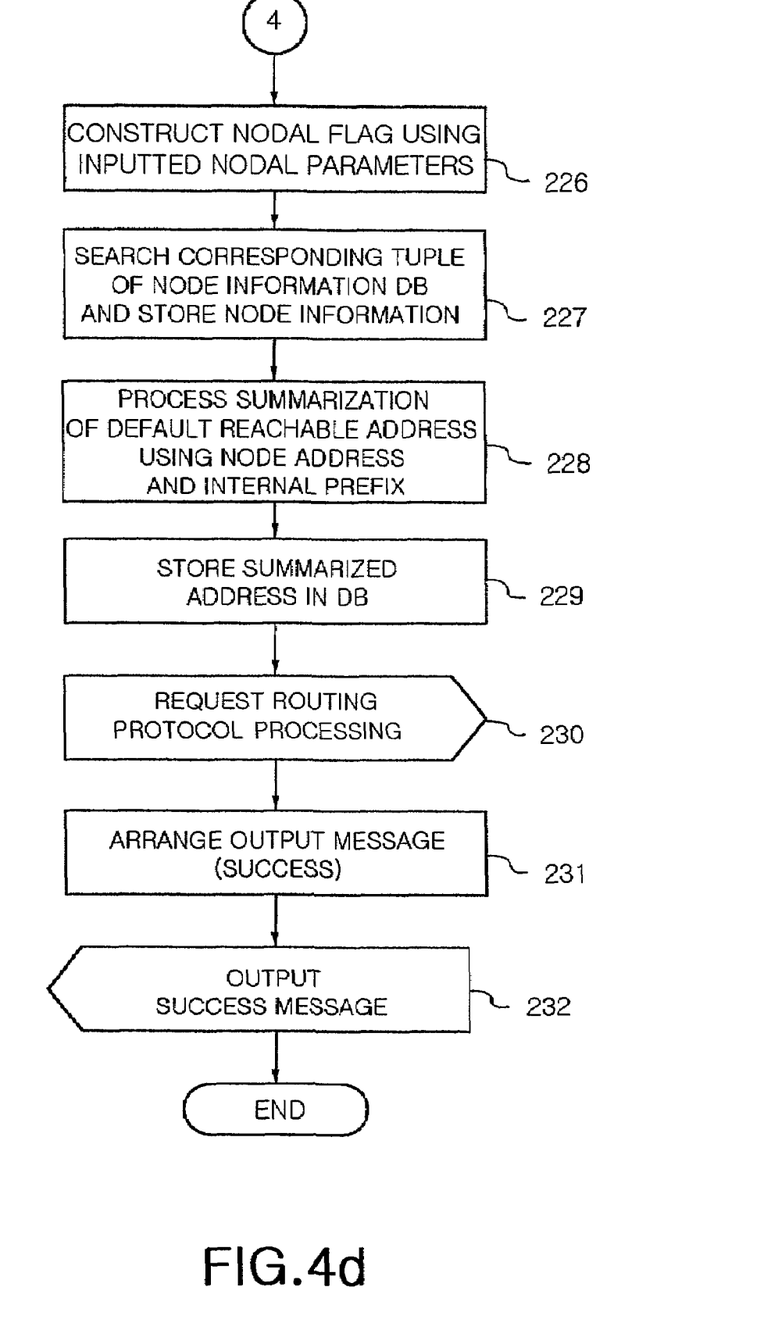

Next, by summarizing the node address of the node information up to the bit length of an internal prefix to define the internal prefix as a default reachable summary address, summarization for default reachable address is performed in step 228. Subsequently, the summarized default reachable address is registered in the default reachable information database 60 shown in FIG. 2c in step 229 and the processing of a routing protocol with an external node is required in step 230. This allows the default summarization address of the lowest level node to be notified to the external node. Subsequently, an output message "success" is arranged in step 231, a processing success message is outputted in step 232, and then the process is terminated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for summarizing a default address of private network-network interface lowest level node, which is applicable to an asynchronous transfer mode (ATM) switching system employing private network-network interface (PNNI) for public networks, comprising:
   a first step of constructing a database for storing prefix information, node information, and reachable address information;
   a second step of arranging parameters inputted for creating an internal prefix to be adaptable to the system, generating the prefix information by checking the validation and address system of the parameters inputted for creating the internal prefix, and registering the prefix information in the prefix information database;
   a third step of creating an ATM end system address by checking the validation and address system of parameters inputted for generating the node information, and if it is determined that the ATM end system address includes internal prefix and a node address is not yet assigned from the digit state of the ATM end system address, generating the node information using the parameters for creating the node information and the ATM end system address, and registering the node information in the node information database; and
   a fourth step of summarizing the node address of the node information up to the bit length of an internal prefix and performing summarization of a default reachable address by defining the internal prefix as the default reachable summarization address.

2. The method according to claim 1, wherein the prefix information database is constructed in a sequential manner by the number of prefixes acceptable by the system, the node information database is constructed in a sequential manner by the number of nodes acceptable by the system, and the reachable address information database is constructed by the number of reachable addresses acceptable by the node.

3. The method according to claim 1 or 2, wherein the prefix information database has a plurality of tuples, each comprising a prefix information key, a numbering plan identifier, type of number, a call type, a protocol type, a prefix digit, and a prefix length, and the prefix digit functions as a key to allow a corresponding one of the tuples to be accessed.

4. The method according to claim 1 or 2, wherein the node information database has a plurality of tuples, each comprising node number, node id, peer group id, an ATM end system address (AESA), a level ID, a leader priority, and a nodal flag, and the node number functions as a key to allow a corresponding one of the tuples to be accessed.

5. The method according to claim 1 or 2, wherein the reachable address information database has a plurality of tuples, each comprising a reachable address prefix, a reachable address prefix length, a port identifier, a scope advertisement, and a level ID, and the reachable address functions as a key to allow a corresponding one of the tuples to be accessed.

6. The method according to claim 1, wherein the second step comprises:
a first substep of arranging the parameters inputted for creating the internal prefix to be adaptable to the system when a prefix creation request is inputted;
a second substep of checking the validation of the inputted parameters, as a result of the check, defining an authority and format identifier according to type of the address system, and generating the prefix information using the authority and format identifier and the inputted parameter; and
a third substep of registering the prefix information created in the second substep in the information database.

7. The method according to claim 6, wherein the second substep comprises:
a step of checking the validation of the inputted parameters;
a step of determining which of E.164, Data Country Code (DDC), and International Code Designator (ICD) the type of an address system corresponds to, in accordance with the result of the validation check;
a step of defining the authority and format identifier to be adaptable to the type of an address system; and
a step of generating the prefix information using the authority and format Identifier and the inputted parameters.

8. The method according to claim 6, wherein the third substep comprises:
a step of checking the address type of the prefix information and determining whether the checked type is an internal prefix or an external prefix; and
a step of registering the created prefix information as internal prefix information and external prefix information, respectively, according to the result of the determination on the address type.

9. The method according to claim 1, wherein the third step comprises:
a first substep of arranging the parameters inputted for creating the node information to be adaptable to the system when a node creation request is inputted;
a second substep of checking the type of an address system of the inputted parameters, defining an Authority and Format Identifier according to the type, and generating an ATM End System Address using the defined Authority and Format Identifier and the inputted parameters; and
a third substep of generating a node ID, a peer group ID and a node flag as the node information using the parameters for generating the node information and the ATM end system address, and registering the node information in the node information database if it is determined that the ATM end system address includes an internal prefix and a node address is not yet assigned from the digit state of the ATM end system address.

10. The method according to claim 9, wherein the second substep comprises:
a step of storing the inputted parameters when it is determined that the parameters are useful as a result of the check of their validation, and otherwise, outputting a processing error message informing that the inputted parameters are improper;
a step of determining which of E.164, Data Country Code (DCC) and International Code Designator (ICD) the type of address system of the inputted parameters corresponds to;
a step of defining the authority and format identifier to be adaptable to the type of address system; and
a step of generating the ATM End System Address using the defined Authority and Format Identifier and the inputted parameters.

11. The method according to claim 9, wherein the third substep comprises:
a step of determining whether the ATM end system Address includes the internal prefix or not, and outputting a processing error message if the internal prefix is not included;
a step of determining whether the node address is previously registered, is not yet assigned, or is a general subscriber number from the digit state of the ATM End System Address;
a step of generating a node ID, a peer group ID and a nodal flag as the node information using the parameters for generating the node information and the ATM end system address if it is determined that the node address is not yet assigned; and
a step of registering the generated node information in the node information database.

12. A data recording medium storing a computer program which implements a method for summarizing a default address of a PNNI lowest level node, which is applicable to an ATM switching system employing PNNI for public networks, comprising:
a first step of constructing a database for storing prefix information, node information, and reachable address information;
a second step of arranging parameters inputted for creating an internal prefix to be adaptable to the system, generating the prefix information by checking the validation and address system of the parameters inputted for creating the internal prefix, and registering the prefix information in the prefix information database;
a third step of creating an ATM end system address by checking the validation and address system of parameters inputted for generating the node information, and if it is determined that the ATM end system address includes internal prefix and a node address is not yet assigned from the digit state of the ATM end system address, generating the node information using the parameters for creating the node information and the ATM end system address, and registering the node information in the node information database; and a fourth step of summarizing the node address of the node information up to the bit length of an internal prefix and performing summarization of a default reachable address by defining the internal prefix as the default reachable summarization address.

* * * * *